Patented Apr. 7, 1953

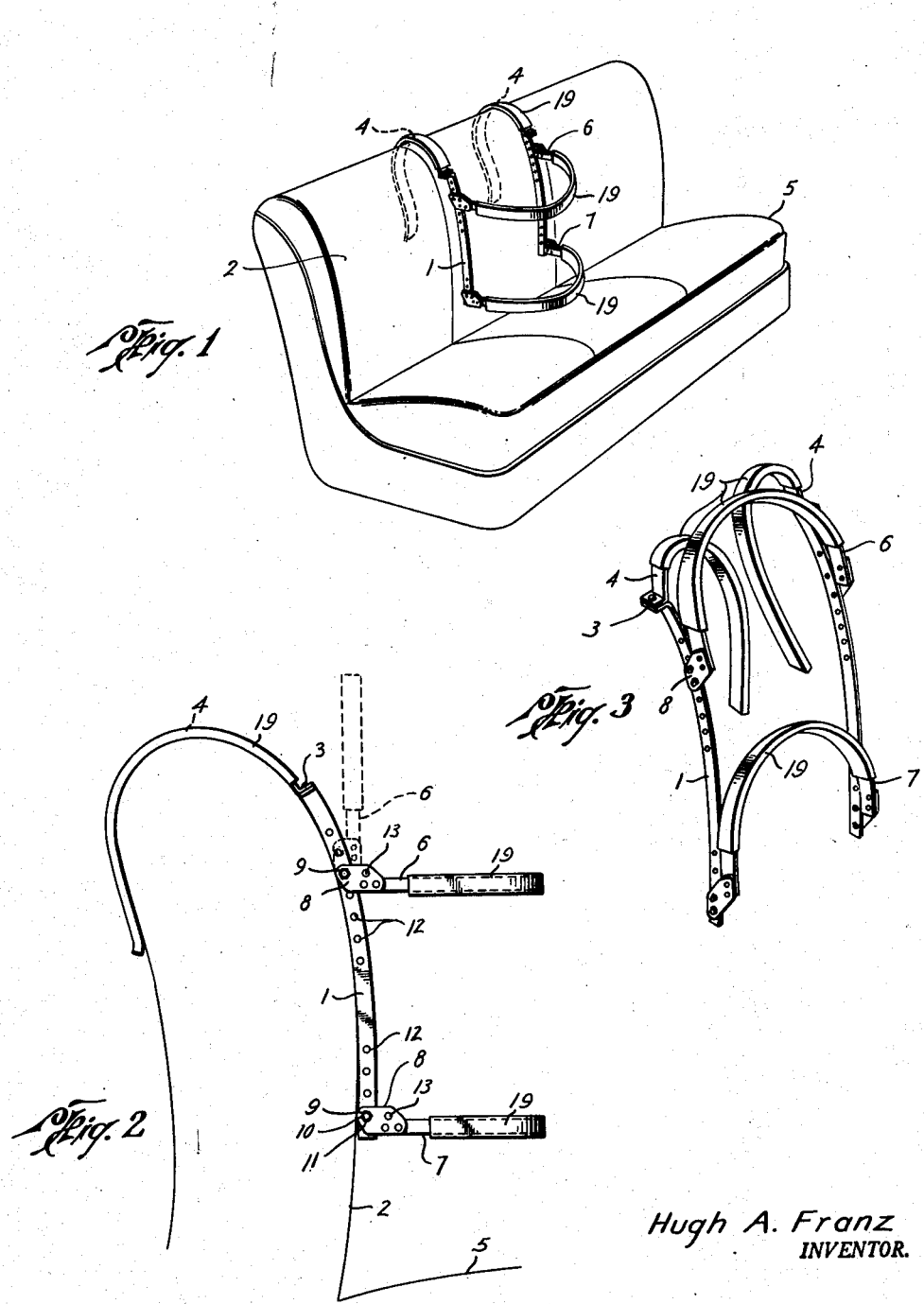
April 7, 1953  H. A. FRANZ  2,633,906
CHILD RETAINER FOR CAR SEATS
Filed May 17, 1951  2 SHEETS—SHEET 1
Hugh A. Franz
INVENTOR.
BY *Lewis H. Wilson*
ATTORNEY April 7, 1953 H. A. FRANZ 2,633,906
CHILD RETAINER FOR CAR SEATS
Filed May 17, 1951 2 SHEETS—SHEET 2
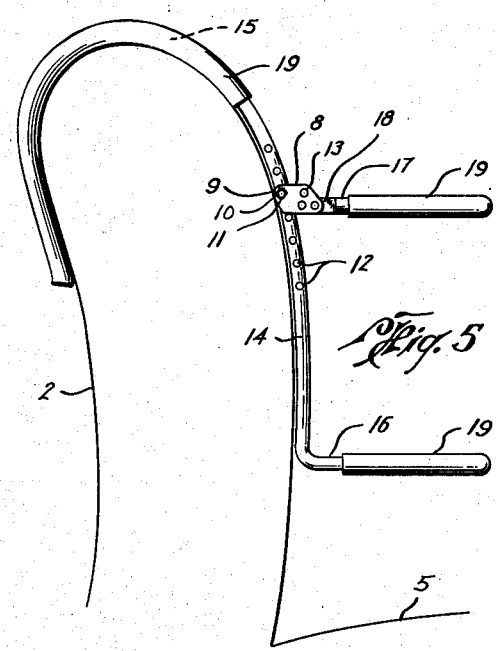
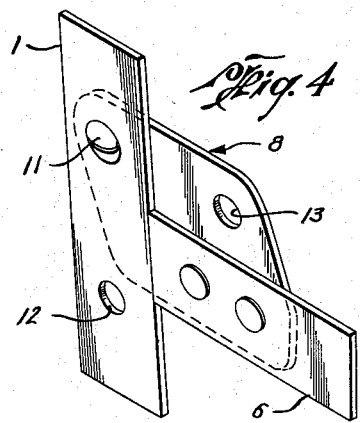
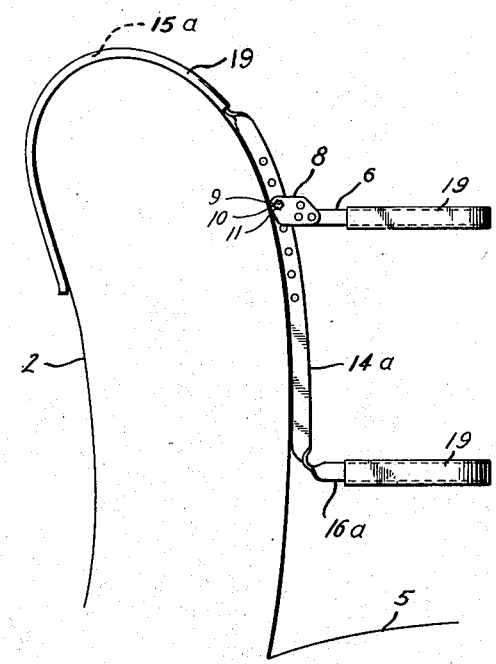
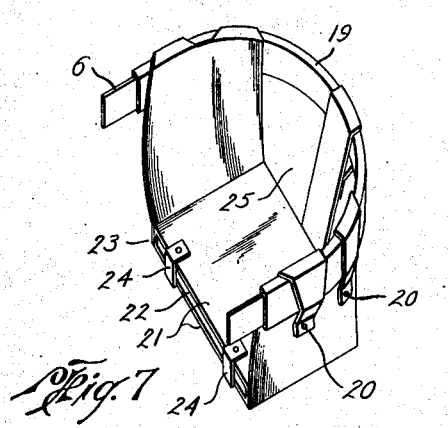
Hugh A. Franz
INVENTOR.
BY Lewis H. Wilson
ATTORNEY

2,633,906

UNITED STATES PATENT OFFICE 2,633,906

CHILD RETAINER FOR CAR SEATS

Hugh A. Franz, Houston, Tex.

Application May 17, 1951, Serial No. 226,880

9 Claims. (Cl. 155—189)

This invention relates to a child retainer for car seats and the like, and more particularly to a device for retaining and protecting a child while in a car seat either in a sitting or standing position.

Usually, a child, up to the age of about three, rides in the front seat of an automobile beside the driver and often is unattended. Whether attended or not the child is in the most dangerous position in the car. Statistics have shown that the passenger in the right-hand front seat is subjected to at least four chances of suffering injury or death to the driver's one chance. The chief reason for this is that the driver has the steering wheel to restrain his displacement in the event of an accident, whereas his companion has nothing between him and the windshield, the dash with its sharp edges and knobs. Thus a child riding in this part of the car is still in a very dangerous position even though attended.

In view of this serious problem a number of devices for protecting children under these circumstances have been offered. While these devices possess merit they have not solved the problem adequately. One major disadvantage common to all known such devices is that they confine the child to such a great extent as to materially affect the comfort of the child. Another drawback is that the devices are unnecessarily complicated in construction and operation. These disadvantages limit the application of the devices and seriously lessen their utility and practicality.

An object of this invention is to provide a child retainer for car seats and the like. A further object is to provide a device which retains and protects a child in a car seat while sitting and also while standing. A still further object is to provide such a device in which the child is relatively unconfined although safely retained, said device being further characterized by simplicity in construction and operation, by possessing utility to a high degree, and by being foldable when not in use to a very compact unit occupying very little space. These and other objects will be apparent from the description of this invention given hereinafter.

A preferred embodiment of the present invention now will be described with reference to the accompanying drawings wherein like reference numerals are used to indicate identical parts.

Referring to the drawings generally:

Figure 1 is a perspective view showing the device attached to a car seat.

Figure 2 is a side elevation of the device of Figure 1.

Figure 3 is an isometric view of the device of Figures 2 and 3 in a folded position.

Figure 4 is an enlarged isometric view showing certain details of the invention.

Figure 5 is a side elevation showing a second embodiment of the present invention.

Figure 6 is a side elevation showing certain alternatives of the device of Figure 5.

Figure 7 is an isometric view of an accessory which is quite useful in combination with the device of the present invention.

Referring to the drawings in greater detail and particularly Figures 1-4, the vertical metal bars 1 rest against the seat back 2 of an automobile as shown. To the upper ends of each of the vertical bars is pivotally attached, e. g. by means of a rivet 3, a hook-like metal bar 4 which is practically an inverted U. These hooks 4 pass over the top of the seat back and extend downwardly along the rear of the seat back and hold the vertical bars 1 against the seat back and up above the seat cushion 5.

A substantially semi-circular bar member 6 is pivotally and adjustably attached at each end thereof to the upper portion of the vertical bars 1. Another substantially semi-circular bar member 7 is pivotally and adjustably attached at each end thereof to the lower portion of the vertical bars 1.

To each end of bar members 6 and 7 is fixedly attached a plate 8. These four plates 8 serve several purposes. Bar members 6 and 7 are pivotally and adjustably attached to the vertical bars 1 by means e. g. of lock nuts 9 and bolts 10 passing through openings 11 in the plates and any of the adjustment openings 12 desired along the vertical bars 1. As the bar members 6 and 7 are pivoted downwardly toward the seat cushion 5, their downward movement is stopped by their ends abutting against the vertical bars 1, and in this normal in-use position the bar members 6 and 7 extend from the vertical bars 1 at approximately right angles thereto. Preferably the nuts 9 are tightened enough so that the friction between plates 8 and vertical bars 1 is sufficient to retain bar members 6 and 7 when not in use in an upright position against the front of the seat back 2. If desired, particularly for storing and shipping, bar members 6 and 7 may be locked in this upright position and for this purpose there is provided openings 13 in the plates 8. The distance between the plate openings 11 and 13 is the same as the distance between the openings 12 in the vertical bars 1. As an alternative or supplementary means for retaining bar members 6 and 7 in said upright position, the upper free portions of plates 8 may be bent slightly inwardly, the amount of the bend gradually increasing from the back end to the front end of the plate so that as bar members 6 and 7 are raised toward the seat back, plates 8 become progressively more binding on the vertical bars 1.

Desirably the device according to the preferred embodiment of this invention above described is made of bar material in order to facilitate the fabrication thereof, however it will be understood that it can be made of rods or other shapes of materials by making obvious modifications in the manufacture thereof. Also it will be noted that the device according to this embodiment comprises essentially six parts, namely the two hooks 4, the two vertical bars 1, and the two semi-circular rod members 6 and 7.

The advantage of this particular embodiment of this invention, in addition to simplicity of fabrication, is that it is highly adjustable to suit almost any need of the user. Another important advantage is that it can be readily folded for handling, shipping and storing. As will be noted from the foregoing description and from Figure 3, the device folds to a flat object occupying very little space. The hooks 4 fold inwardly and bar members 6 and 7 fold up against the vertical bars 1. Of course, the device can also be shipped disassembled.

A second embodiment of this invention will now be described with reference to the drawings.

Referring to the drawings, and in particular to Figure 5, the vertical metal rods 14 rest against the seat back 2 of an automobile as shown. At their upper ends the rods are bent into a hook shape which is practically an inverted U. These hooks 15 pass over the top of the seat back and extend downwardly along the rear of the seat back and hold the vertical rods 14 against the seat back and up above the seat cushion 5.

The lower portion of the vertical rods are bent into a curved shape (preferably semi-circular) member 16. The vertical rods 14 are bent so that the semi-circular member 16 is formed and extends from the vertical portion of the rods at approximately a right angle and is spaced upwardly above the seat cushion 5.

Thus it will be seen that the portion of the device so far described according to this embodiment may be made easily from a single rod by bending it into the shape shown.

A similar semi-circular rod member 17 is attached at each end thereof to the upper portion of the vertical rods 1 and extends forwardly out over the seat cushion and in a plane substantially parallel to the plane in which said first rod member 16 is disposed. This rod member 17 may be fixedly attached to vertical rods 14, e. g. by welding or other fastening means, but preferably it is both pivotally and adjustably attached thereto as shown.

Desirably the upper rod member 17 is attached to the vertical rods 14 (Figure 5) by substantially the same means as the corresponding upper bar 6 is attached to corresponding vertical bars 1 (Figure 2). Accordingly each end of rod member 17 is machined to form a substantially flat or bar portion 18 (Figure 5) to which a plate 8 is attached. The plate has two openings 11 and 13 and the vertical rods 14 have a number of adjustment openings 12. The upper rod member 17 is held in place at any desired point along the vertical rods by lock nuts 9 and bolts 10 which pass through the back opening 11 in the plate and one of the openings 12 in the vertical rods 14.

The semi-circular rod member 17 may be held in an upright position against the back of the seat by fastening said member 17 to the vertical rods 14 through the front opening 13 of the plate 8 and any of the openings 12 which index with said plate opening. Thus the plates 8 in this embodiment of this invention serve the same purpose and function in the same manner as in the first embodiment described hereinbefore.

The device of this invention according to the above described second embodiment thereof consists essentially of two main parts, namely the rod forming the upper semi-circular member 17 and the rod forming the hooks 15, vertical members 14 and lower semi-circular member 16. While from the standpoint of fabrication it is preferred that this second embodiment of this invention be made from rod material, it is not necessary. In the event a bar or similar form is used, it is desirable to have the flat surface or width dimension of the bar facing the child in order to provide greater protection. Therefore if a single bar (Figure 6) is substituted for the rod forming the hooks 15, side elements or vertical rods 14 and semi-circular rod member 16, the substituted bar, in addition to being bent as the rod to form the hooks 15-a and lower semi-circular member 16-a, is also twisted at these bends as shown in order that the flat part or width of the bar forming the hooks and lower semi-circular member will be against the car seat and facing the user, respectively. The upper semi-circular bar member corresponding to bar member 6 (Figure 2) of the first embodiment hereof preferably will be attached to the vertical bars 14-a in the same manner as bar member 6 is attached to vertical bars 1.

This invention of course is not limited to the use of any particular type of material or shape of material. Metal, plastic, or other suitable type material in the form of rods, bars, pipes, or other forms may be used. Likewise the invention is not limited to the contour of the members 6, 7, 16 and 17. The contour of said members may conform to that of an arch or a U or other desired contour, but preferably the contour is substantially semi-circular.

Although not essential, as added protection it is preferred to pad the hooks 4 and 15 and the semi-circular members 6, 7, 16 and 17. This may be accomplished as shown by covering them with a rubber tubing 19 or the like. Alternatively, they may be covered with tubular sponge or foam rubber as a padding and if desired the padding may be covered with leatherette or plastic.

While the child is standing, the semi-circular members are in the horizontal position shown in Figure 1. Normally the lower semi-circular member passes around the front of the child at a height between its knees and hips and the upper such member passes around the front of the child between its waist and armpits. While the child is in a sitting position, the upper semi-circular member may be folded back against the car seat (Figure 2) and the lower semi-circular member passes around the front of the child about the height of its waistline.

While the use of two semi-circular members is preferred, more than two or only one may be used. When using one such member it is adjusted along the vertical elements 1, 14 to adapt it to the standing or sitting position of the child as needed. If only one semi-circular member should be employed, bracing (not shown) would be necessary to hold said vertical elements the desired predetermined distance apart. However, the use of only one semi-circular member is less practical.

It has been found that the hooks effectively anchor the device to the car seat by binding against the back thereof. However, if further anchoring is desired this may be accomplished e. g. by an elastic strap (not shown) attached to the bottom of the vertical elements 1 and 14, which strap extends downwardly along the seat back and between the seat back and cushion and has a ball attached to its free end.

In experimental use of the device of this invention it has been found somewhat desirable in certain instances to provide a means of seating the child in the device at a high level in order that it may look out of the car while being safely retained in a seated position. This is very simply and adequately provided by suspending a removable seat (Figure 7) from the upper semi-circular member 6, 17. A seat made of fabric serves the purpose well and economically. The seat shown is fastened to the upper semi-circular bar member 6 by means of snaps 20. Preferably the seat bottom is made of two layers of cloth 21 and stiff member 22 such as a plastic sheet removably inserted therebetween in order that the stiff member may be removed when the seat is laundered. The stiff member may be removably secured between the two layers of cloth, e. g. by sewing together all edges of the two layers except the edge thereof at the back 23 of the suspended seat and inserting the stiff member between the two layers at this open edge, which open edge is provided with snap-on tabs 24 or a zipper (not shown) to hold the stiff member in place. The child's legs of course pass through the openings 25 in the seat.

The device of the present invention safely retains the child and at the same time does not bind him to give him the uncomfortable feeling of being tied in. The child has complete freedom of movement and can safely change from a sitting to a standing position or vice versa without assistance. In this event the child may use the upper semi-circular member to raise or lower himself.

While the device of this invention has been described in particular with reference to its use in an automobile seat, it is equally applicable for use in railway cars, airplanes, or other vehicles or places where its use is needed.

This application is a continuation of my application Serial Number 184,810, filed September 14, 1950, and entitled "Child Retainer for Car Seats."

As many apparently widely different embodiments of this invention may be made without departing from the spirit and scope thereof, it is to be understood that this invention is not limited to the specific embodiments thereof except as defined in the appended claims.

What is claimed is:

1. A child retainer and protector of the character described, which comprises two substantially rigid side elements in a fixed and spaced-apart relationship to extend vertically along the front of a seat back, hook-like means at the upper ends of said side elements to extend over the top of the seat back and to hold the said side elements against the front of the seat back and in an upwardly spaced relation to the seat cushion, said hook-like means being adapted to extend for a substantial distance down along the back of the seat back and to fit snugly thereagainst, at least two arch-shaped members of rigid material attached at each end thereof to the side elements, one of such members being attached to the upper portion of the side elements and adapted to extend forwardly from the seat back above the seat cushion in a substantially horizontal plane, another of such members being attached to the lower portion of the side elements and adapted to extend forwardly from the seat back above the seat cushion in a plane substantially parallel to the plane in which said first member is disposed, at least the upper arch-shaped member being pivotally attached to said side elements whereby when the user is sitting said upper member may be folded back in a vertical out of use position and when the user is standing said upper member may be folded down in a horizontal position to aid in retaining the user.

2. A child retainer and protector of the character described, which comprises two substantially rigid side elements in a fixed and spaced-apart relationship to extend vertically along the front of a seat back, hook-like means at the upper ends of said side elements to extend over the top of the seat back and to hold the side elements against the front of the seat back and in an upwardly spaced relation to the seat cushion, said hook-like means being adapted to extend for a substantial distance down along the back of the seat back and to fit snugly thereagainst, an arch-shaped member of rigid material attached at each end thereof to the upper portion of the side elements and adapted to extend forwardly from the seat back above the seat cushion in a substantially horizontal plane, a second such arch-shaped member of rigid material attached at each end thereof to the lower portion of the side elements and adapted to extend forwardly from the seat back above the seat cushion in a plane substantially parallel to the plane in which said first member is disposed, at least the upper arch-shaped member being pivotally attached to said side elements whereby when the user is sitting said upper member may be folded back in a vertical out of use position and when the user is standing said upper member may be folded down in a horizontal position to aid in retaining the user.

3. A child retainer and protector of the character described, which comprises two rods in a fixed and spaced-apart substantially parallel relationship to extend vertically along the front of a seat back, the upper portion of said rods terminating to form inverted U-shaped hooks to extend downwardly over the top and back of the seat back and hold the vertical portion of the rods against the front of the seat back and in an upwardly spaced relation to the seat cushion, said hooks being adapted to extend for a substantial distance down along the back of the seat back and to fit snugly thereagainst, the lower portion of said rods converging to form a substantially semi-circular member adapted to project above the seat cushion in a substantially horizontal plane, a second similar substantially semi-circular rod member pivotally attached at each end thereof near the upper termini of the vertical portion of said rods whereby when the user is sitting said upper member may be folded back in a vertical out of use position and when the user is standing said upper member may be folded down in a horizontal position to aid in retaining the user, means for stopping said second semi-circular rod member when pivoted into a plane substantially parallel to the horizontal plane in which the first semi-circular rod member is fixedly disposed.

4. The device of claim 3, in which means is provided for adjusting the second semi-circular rod member along the vertical rods to extend at various heights from the seat cushion.

5. The device of claim 3, in which the hooks and semi-circular rod members are padded and in which means is provided to retain said second semi-circular rod member when not in use in an upright position adjacent the front of the seat back.

6. A child retainer and protector of the character described, which comprises two substantially rigid side elements in a fixed and spaced-apart relationship to extend vertically along the front of a seat back, hook-like means pivotally attached at the upper ends of said side elements to extend over the top of the seat back and hold said side elements against the front of the seat back and in an upwardly spaced relation to the seat cushion, said hooks being adapted to extend for a substantial distance down along the back of the seat back and to fit snugly thereagainst, an arch-shaped member of rigid material pivotally attached at each end thereof to the upper portion of said side elements and adapted to extend forwardly from the seat back above the seat cushion in a substantially horizontal plane, a second such arch-shaped member of rigid material pivotally attached at each end thereof to the lower portion of said side elements and adapted to extend forwardly from the seat back above the seat cushion in a plane substantially parallel to the plane in which said first member is disposed.

7. A child retainer and protector of the class described, which comprises two bars in a fixed and spaced-apart substantially parallel relationship to extend vertically along the front of a seat back, inverted U-shape hooks pivotally attached at the upper ends of said bars to extend over the top of the seat back and hold said bars against the front of the seat back and in an upwardly spaced relation to the seat cushion, said hooks being adapted to extend for a substantial distance down along the back of the seat back and to fit snugly thereagainst, a substantially semi-circular member of rigid material pivotally attached at each end thereof to the upper portion of said bars and adapted to extend forwardly from the seat back above the seat cushion in a substantially horizontal plane, a second such substantially semi-circular member of rigid material pivotally attached at each end thereof to the lower portion of said bars and adapted to extend forwardly from the seat back above the seat cushion in a plane substantially parallel to the plane in which said first member is disposed, means for stopping said semi-circular members when pivoted into said planes.

8. The device of claim 7, in which means is provided for adjusting said semi-circular members along said bars to extend at various heights from the seat cushion.

9. The device of claim 7, in which said hooks and semi-circular members are padded and in which means is provided to retain said semi-circular members when not in use in an upright position adjacent the front of the seat back.

HUGH A. FRANZ.

REFERENCES CITED

The following references are of record in the file of this patent:

UNITED STATES PATENTS

| Number | Name | Date |
| --- | --- | --- |
| 1,039,647 | Carter | Sept. 24, 1912 |
| 1,680,794 | Lawler | Aug. 14, 1928 |
| 2,359,599 | Allen | Oct. 3, 1944 |
| 2,509,103 | Lewis | May 23, 1950 |
| 2,546,790 | Shook | Mar. 27, 1951 |
| 2,557,556 | Morris | June 19, 1951 |
| 2,571,823 | Bonk | Oct. 16, 1951 |